United States Patent
Sakai

(10) Patent No.: US 11,070,099 B2
(45) Date of Patent: Jul. 20, 2021

(54) COOLING STRUCTURE OF STATOR OF ROTATING ELECTRICAL MACHINE

(71) Applicant: MEIDENSHA CORPORATION, Tokyo (JP)

(72) Inventor: Tamotsu Sakai, Yamanashi (JP)

(73) Assignee: MEIDENSHA CORPORATION, Tokyo (JP)

(*) Notice: Subject to any disclaimer, the term of this patent is extended or adjusted under 35 U.S.C. 154(b) by 0 days.

(21) Appl. No.: 16/641,328

(22) PCT Filed: Aug. 6, 2018

(86) PCT No.: PCT/JP2018/029323
§ 371 (c)(1),
(2) Date: Feb. 24, 2020

(87) PCT Pub. No.: WO2019/039243
PCT Pub. Date: Feb. 28, 2019

(65) Prior Publication Data
US 2020/0389062 A1 Dec. 10, 2020

(30) Foreign Application Priority Data
Aug. 25, 2017 (JP) .............................. JP2017-161829

(51) Int. Cl.
*H02K 1/20* (2006.01)
*H02K 9/19* (2006.01)

(52) U.S. Cl.
CPC .................. *H02K 1/20* (2013.01); *H02K 9/19* (2013.01)

(58) Field of Classification Search
USPC .................................................... 310/52–65
See application file for complete search history.

(56) References Cited

U.S. PATENT DOCUMENTS 6,579,202 B2* 6/2003 El-Antably ............... B60K 6/26
  184/6.12
10,892,668 B2* 1/2021 Mcbride ................ B60K 6/405
(Continued)

FOREIGN PATENT DOCUMENTS

CN   102820738 A   12/2012
CN   101953052 B   8/2013
(Continued)

OTHER PUBLICATIONS

Chinese Office Action, Application No. 201880054400.7, dated Aug. 3, 2020, 7 pages.
(Continued)

*Primary Examiner* — Quyen P Leung
*Assistant Examiner* — Minki Chang
(74) *Attorney, Agent, or Firm* — Foley & Lardner LLP

(57) ABSTRACT

In order to provide a cooling structure of a stator of a rotating electrical machine that is capable of surely cooling a stator coil end of each unit coil, a cooling structure of a stator of a rotating electrical machine that conducts cooling of a stator coil end (42A) by a refrigerant is provided with an oil guide (52) including a refrigerant passage (521) that is disposed to be opposed to an axial end portion of the stator coil end (42A), the refrigerant flowing through the refrigerant passage (521); and a refrigerant discharging portion (523) that projects from the refrigerant passage (521) toward the stator coil end (42A) of each unit coil (42a) and discharges the refrigerant from a tip end thereof.

5 Claims, 5 Drawing Sheets

(56) References Cited

U.S. PATENT DOCUMENTS

| | | | |
|---|---|---|---|
| 2010/0045125 A1* | 2/2010 | Takenaka | H02K 9/19 310/54 |
| 2010/0052441 A1 | 3/2010 | Fukushima | |
| 2012/0235521 A1 | 9/2012 | Cai et al. | |
| 2014/0125162 A1 | 5/2014 | Tsuchie | |
| 2017/0047822 A1 | 2/2017 | Horii et al. | |

FOREIGN PATENT DOCUMENTS

| | | |
|---|---|---|
| CN | 106411050 A | 2/2017 |
| FR | 2260890 A1 | 9/1975 |
| FR | 3026575 A1 | 4/2016 |
| JP | 07-027270 U | 5/1995 |
| JP | 9-154257 A | 6/1997 |
| JP | 2007-312569 A | 11/2007 |
| JP | 2010-57261 A | 3/2010 |
| JP | 2011-193642 A | 9/2011 |
| JP | 2013-135577 A | 7/2013 |
| JP | 2014-96876 A | 5/2014 |
| JP | 2015-70655 A | 4/2015 |
| JP | 2015-211543 A | 11/2015 |
| WO | WO 2015/181889 A1 | 12/2015 |

OTHER PUBLICATIONS

Extended European Search Report, Application No. 18848460.4, dated Mar. 31, 2021, 10 Pages.

* cited by examiner

COOLING STRUCTURE OF STATOR OF ROTATING ELECTRICAL MACHINE

The present invention relates to a cooling structure of a stator of a rotating electrical machine.

BACKGROUND ART

Hitherto, as a stator cooling structure of a rotating electrical machine, there has been known one that is configured to cool a coil end by dropping refrigerant from above the coil end. For example, in case that the coil is formed by concentrated winding, coils that are adjacent to each other in the circumferential direction are spaced away from each other. Therefore, even if refrigerant is dropped from above coil end, there has been a problem in which it is difficult to propagate refrigerant to adjacent coil, thereby making an efficient coil end cooling impossible.

Against such problem, the following Patent Publication 1 discloses a cooling device of a vehicle power transmission apparatus in which an outer peripheral annular oil tube and an inner peripheral annular oil tube are provided, these are respectively formed with a plurality of discharging holes for discharging cooling oil toward coil ends, and cooling oil is supplied to the annular oil tubes, thereby uniformly supplying cooling oil in the circumferential direction of the coil ends.

The following Patent Publication 2 discloses an oil cooling structure of a motor, in which an oil passage cover that covers an opening surface of a circumferential oil passage extending along the circumferential direction of a motor is formed with a plurality of discharging holes at predetermined intervals, and oil is supplied from these discharging holes towards the clearances between adjacent coils, thereby supplying oil to all of the coils.

Furthermore, each of the following Patent Publications 3 and 4 discloses a cooling structure of a rotating electrical machine, in which a side cover for protecting a rotor and a stator is formed with a discharging hole for supplying refrigerant via a passage, and refrigerant is discharged from this discharging hole, thereby improving coil cooling efficiency.

Furthermore, the following Patent Publication 5 discloses a cooling structure of a rotating electrical machine, in which there is provided a refrigerant passage tube that extends in the circumferential direction along an outer end surface in the axial direction of the rotating electrical machine, and a plurality of openings that communicate with the inside of the tube are formed at positions that are opposed to the outer end surface in the axial direction of the rotating electrical machine and are on an outer peripheral surface of this refrigerant passage tube, thereby efficiently cooling the rotating electrical machine.

PRIOR ART PUBLICATIONS

Patent Publications

Patent Publication 1: JP Patent Application Publication 2007-312569
Patent Publication 2: JP Patent Application Publication 2010-57261
Patent Publication 3: JP Patent Application Publication 2014-96876
Patent Publication 4: JP Patent Application Publication 2015-70655
Patent Publication 5: JP Patent Application Publication 2015-211543

SUMMARY OF THE INVENTION

Task to be Solved by the Invention

In the above-mentioned conventional structures, however, for example, in case that an end portion (exit wire) of a wire that forms each unit coil is connected by a bus bar, there has been a risk that refrigerant does not reach coil end, depending on the distance between a refrigerant discharging portion and coil end, such as extension of the distance between the refrigerant discharging portion and coil end by the existence of this bus bar.

From such thing, the present invention is characterized by providing a cooling structure of a stator of a rotating electrical machine that is capable of surely cooling a stator coil end of each unit coil.

Means for Solving Task

A cooling structure of a stator of a rotating electrical machine according to a first invention for solving the above task is a cooling structure of a stator of a rotating electrical machine that conducts cooling of a stator coil end by a refrigerant, characterized by being equipped with an oil guide comprising:

a refrigerant passage that is disposed to be opposed to an axial end portion of the stator coil end, the refrigerant being introduced into the refrigerant passage; and a refrigerant discharging portion that projects from the refrigerant passage toward the stator coil end of each unit coil and discharges the refrigerant that has been introduced into the refrigerant passage from a tip end thereof.

Furthermore, in the first invention, a cooling structure of a stator of a rotating electrical machine according to a second invention is characterized in that the oil guide comprises an insulator having heat resistance and oil resistance.

Furthermore, in the first or second invention, a cooling structure of a stator of a rotating electrical machine according to a third invention is characterized in that the coil is formed by concentrated winding.

Furthermore, in any one of the first to third inventions, a cooling structure of a stator of a rotating electrical machine according to a fourth invention is characterized in that the oil guide is disposed to be opposed to the stator coil end on a side that an end portion of a wire constituting the coil is positioned.

Furthermore, in any one of the first to fourth inventions, a cooling structure of a stator of a rotating electrical machine according to a fifth invention is characterized in that the refrigerant passage is a tube formed into an arc shape along arrangement of the stator coil ends.

Furthermore, in any one of the first to fifth inventions, a cooling structure of a stator of a rotating electrical machine according to a sixth invention is characterized in that the oil guide further comprises another refrigerant discharging portion above a bearing that pivotally supports a rotation shaft of the rotating electrical machine, the another refrigerant discharging portion discharging the refrigerant from the refrigerant passage toward a side that is opposite to the refrigerant discharging portion.

Advantageous Effect of the Invention

A cooling structure of a stator of a rotating electrical machine according to the present invention is capable of surely cooling a stator coil end of each unit coil.

MODE FOR IMPLEMENTING THE INVENTION

In the following, a cooling structure of a stator of a rotating electrical machine according to one embodiment of the present invention is explained by using FIG. 1 to FIG. 5.

Figure 1:
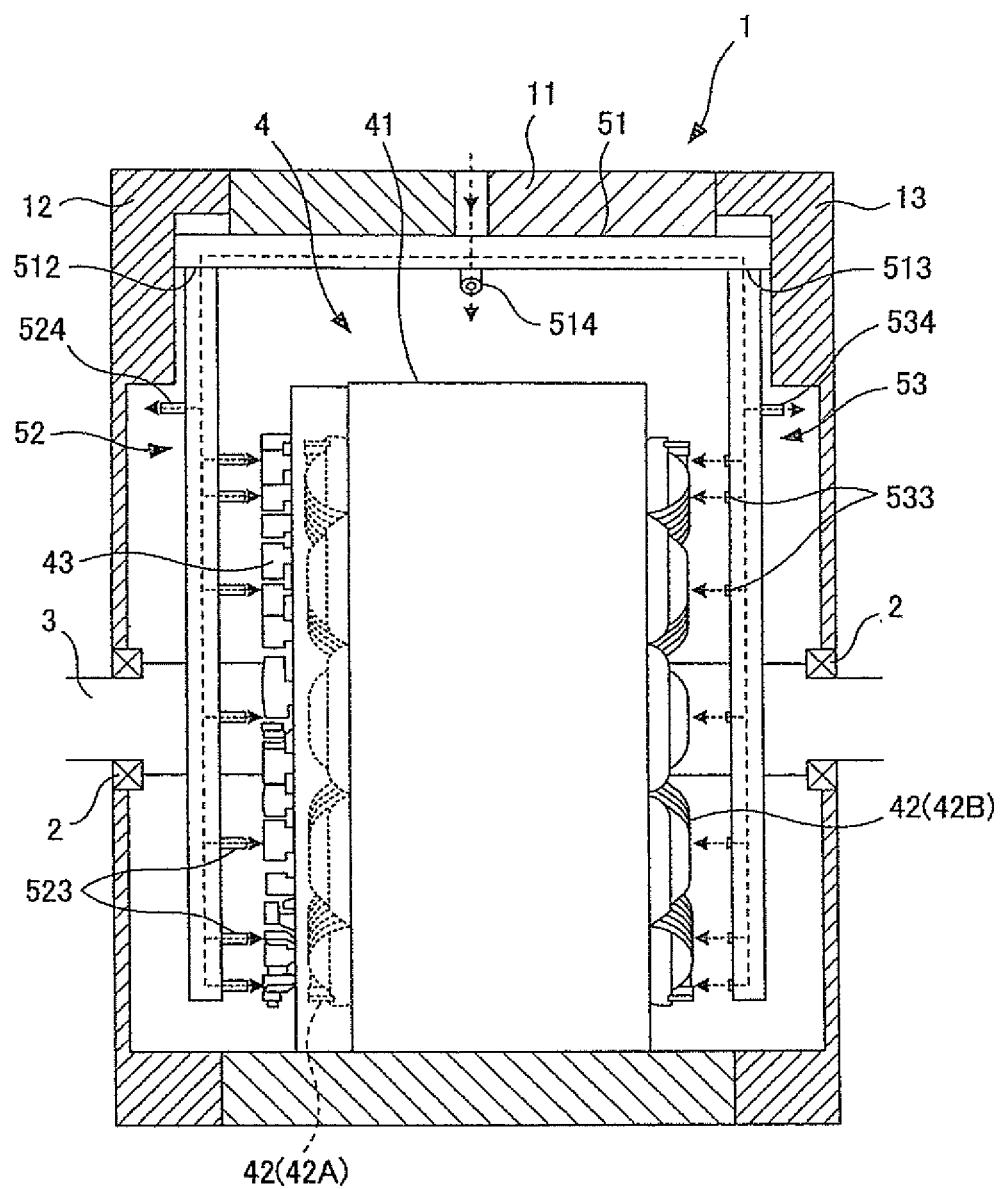
FIG. 1 is a partially sectional view schematically showing a cooling structure of a stator of a rotating electrical machine according to an embodiment of the present invention.
Figure 2:
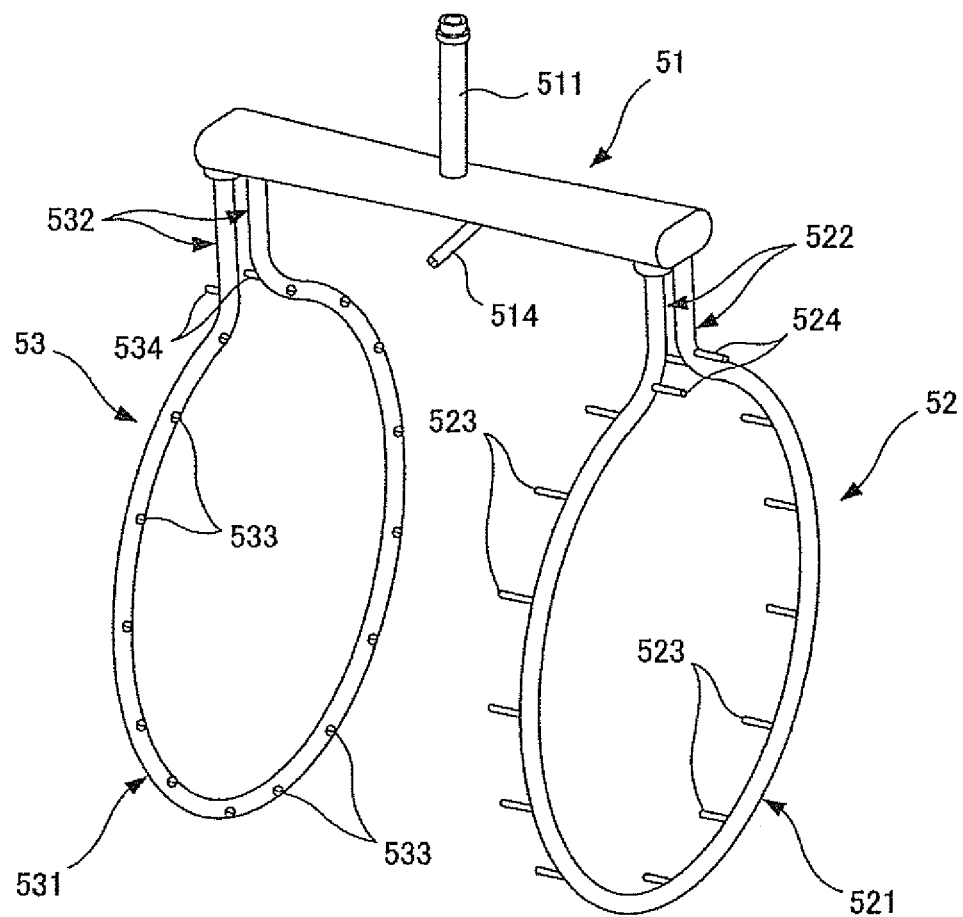
FIG. 2 is a perspective view of a refrigerant supplying body shown in FIG. 1.
Figure 3A:
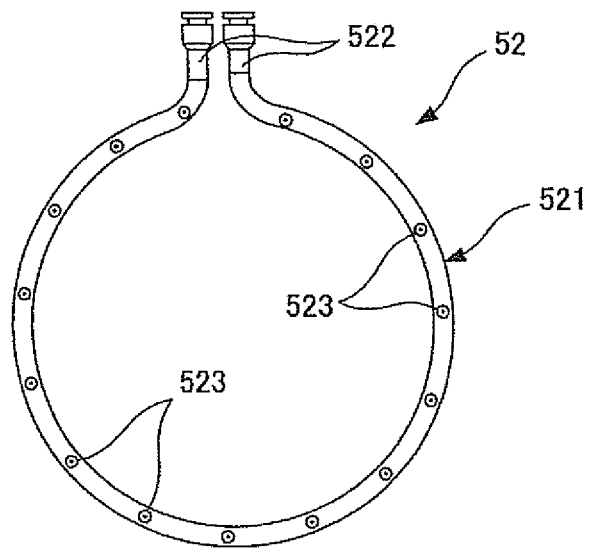
FIG. 3A is a front view of a direct-coupling-side oil guide shown in FIG. 2.
Figure 3B:
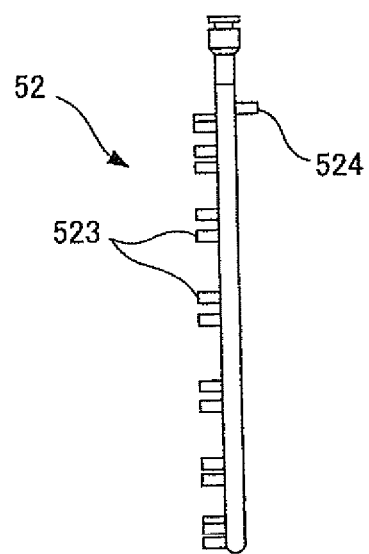
FIG. 3B is a side view of the direct-coupling-side oil guide shown in FIG. 2.
Figure 4A:
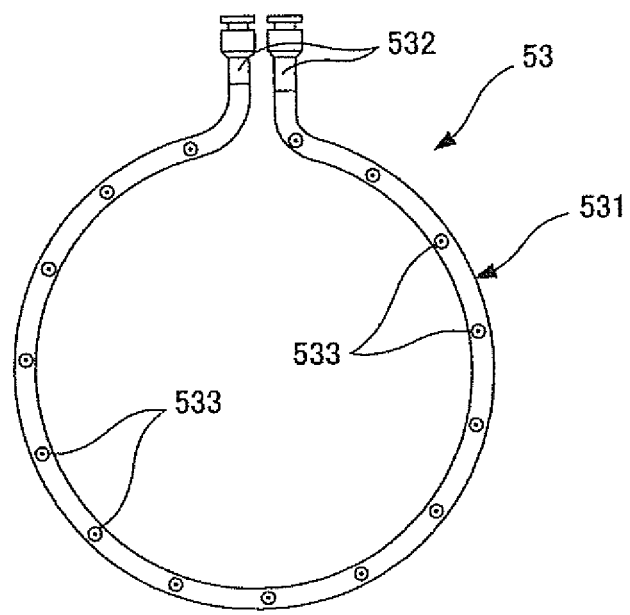
FIG. 4A is a front view of a non-direct-coupling-side oil guide shown in FIG. 2.
Figure 4B:
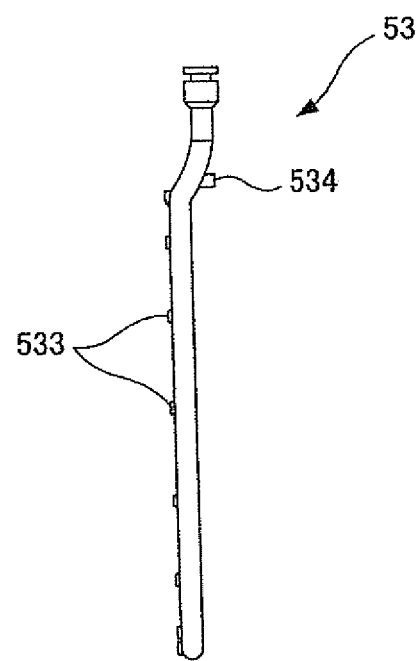
FIG. 4B is a side view of the non-direct-coupling-side oil guide shown in FIG. 2.

As shown in FIG. 1, in the present embodiment, the rotating electrical machine is equipped with a rotation shaft 3 that is rotatably supported in a casing 1 through bearings 2, a rotor (not shown in the drawings) that is fixed to an outer peripheral portion of the rotation shaft 3, and a stator 4 that is disposed to be opposed to the outer peripheral portion of the rotor through an air gap and is fixed to the casing 1.

The casing 1 is constituted to include a generally cylindrical frame 11, and a non-direct-coupling-side bracket 12 and a direct-coupling-side bracket 13 that are mounted on opening portions of this frame 11.

The stator 4 is equipped with stator cores 41 and stator coils wound around the stator cores 41. In the following, parts that project from the stator core 41 of this stator coil 42 toward axial both sides (non-direct-coupling side and direct-coupling side) are referred to as stator coil ends 42A, 42B.

The stator coil 42 is formed by concentrated winding. An end portion (exit wire) of a wire that forms each unit coil 42a (see FIG. 5) is disposed on the non-direct-coupling side. The exit wire is connected by a bus bar 43 per each phase.

Furthermore, as shown in FIG. 1 to FIG. 5, this rotating electrical machine is equipped with a refrigerant supplying body for supplying a refrigerant (cooling oil) to stator coil ends 42A, 42B, etc. The refrigerant supplying body is constituted to include a refrigerant introducing portion 51 that extends along the axial direction, and oil guides 52, 53 that are connected to both sides in the axial direction of the refrigerant introducing portion 51.

The refrigerant introducing portion 51 is a hollow cylindrical body and is fixed, for example, to the frame 11. In the present embodiment, the refrigerant introducing passage 51 is formed into an oval shape in sectional view. This refrigerant introducing portion 51 has an inflow portion 511 for introducing refrigerant that is supplied from the outside of the casing 1, refrigerant supply ports 512, 513 that are respectively connected to the oil guides 52, 53, and a refrigerant supplying nozzle 514 for supplying refrigerant onto the stator cores 41.

The oil guides 52, 53 are made of an insulator (e.g., resin) having heat resistance and oil resistance and are respectively fixed, for example, to brackets 12, 13. The oil guides 52, 53 are those each prepared by forming a tube with opened both ends into a generally arc shape, and the both ends extend generally straight toward the outside in the radial direction. In the following, arc parts of the oil guides 52, 53 are referred to as arc portions 521, 531, and straight parts toward the outside in the radial direction are referred to as straight portions 522, 532. In the present embodiment, the arc portions 521, 531 and the straight portions 522, 532 constitute a refrigerant passage.

The arc portions 521, 531 of these oil guides 52, 53 are respectively disposed to be opposed to axial end portions of the stator coil ends 42A, 42B. Furthermore, tip ends (opening portions) of the straight portions 522, 532 of the oil guides 52, 53 are respectively connected to the refrigerant supply ports 512, 513 of the refrigerant introducing portion 51.

The oil guide 52 is provided with a refrigerant discharging portion 523 of the arc portion 521 that is formed at a position corresponding to the stator coil end 42A of each unit coil 42a, and refrigerant discharging portions (other refrigerant discharging portions) 524 of the straight portions 522 that are formed at positions opposed to an inner peripheral surface of the casing 1.

Figure 5:
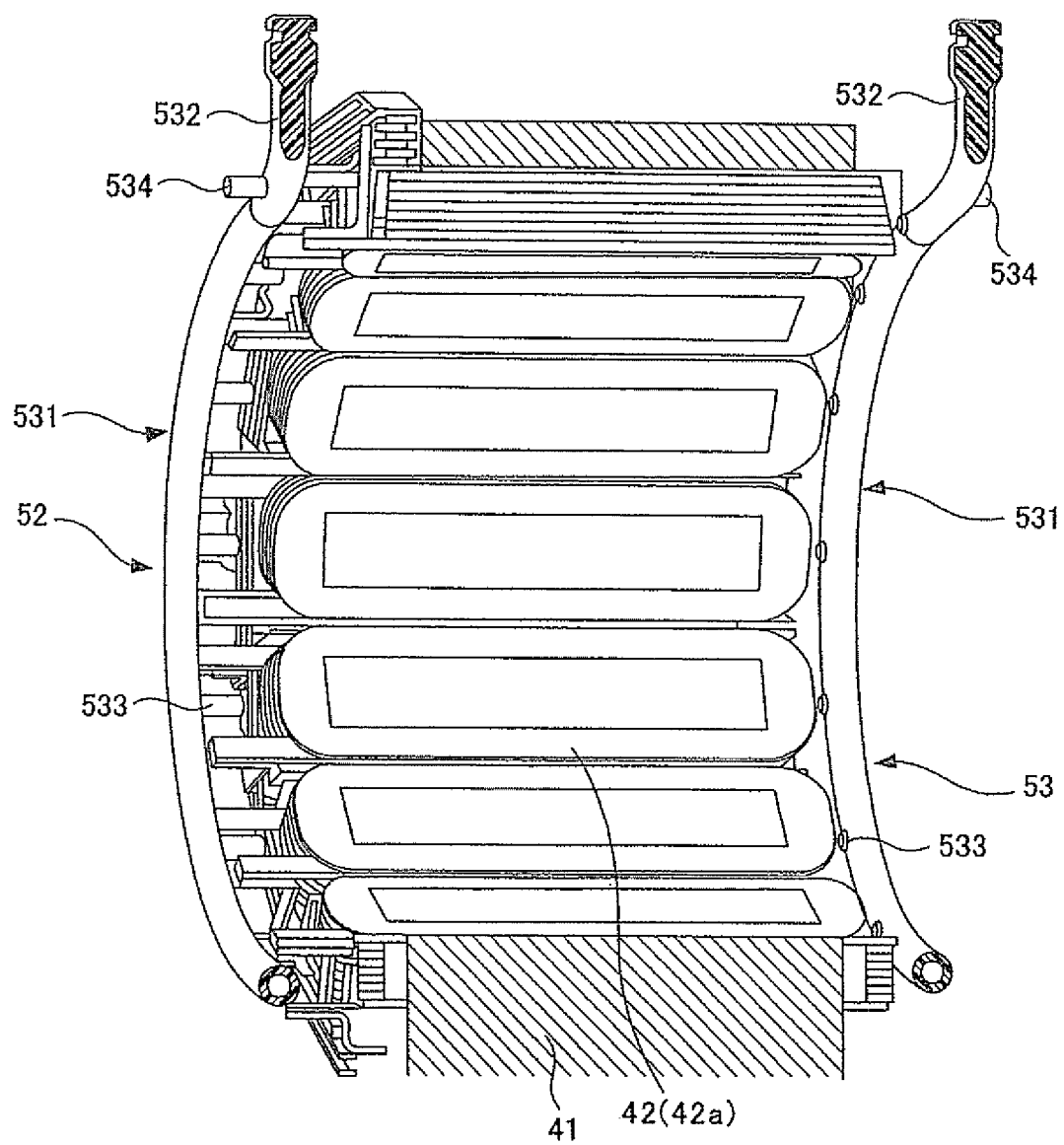
FIG. 5 is a perspective view showing a part of FIG. 1 broken away.

In the present embodiment, the refrigerant discharging portion 523 of the oil guide 52 is a projection portion that extends from the arc portion 521 toward the stator coil end 42A side. That is, the refrigerant discharging portion 523 is constituted to eject refrigerant from a tip end of a projection that extends from the arc portion 521 toward the stator coil end 42A. As shown in FIG. 5, the refrigerant discharging portion 523 is arranged such that its tip end is positioned on the stator coil end 42A side than the tip end of the exit wire and the tip end of the bus bar 43.

Furthermore, the refrigerant discharging portion 524 of the oil guide 52 is a projection portion that extends from the straight portion 522 toward the inner peripheral surface side of the casing 1. That is, the refrigerant discharging portion 524 is constituted to eject refrigerant from a tip end of a projection that extends from the straight portion 522 toward the inner peripheral surface of the casing 1.

Furthermore, the oil guide 53 is provided with a refrigerant discharging portion 523 of the arc portion 531 that is formed at a position corresponding to the stator coil end 42B of each unit coil 42a, and refrigerant discharging portions (other refrigerant discharging portions) 534 of the straight portions 532 that are formed at positions opposed to an inner peripheral surface of the casing 1.

In the present embodiment, a refrigerant discharging portion 533 of the oil guide 53 is an opened hole that is formed in the arc portion 531 and is constituted to directly eject refrigerant from the arc portion 531 toward the stator coil end 42B.

Furthermore, the refrigerant discharging portion 534 of the oil guide 53 is formed to project from the straight portion 532 toward inner peripheral surface side of the casing 1. That is, the refrigerant discharging portion 534 is constituted to eject refrigerant from a tip end of a projection that extends from the straight portion 532 towards the inner peripheral surface of the casing 1.

By a stator cooling structure of a rotating electrical machine according to the present embodiment structured as above, it is possible to surely supply refrigerant from the refrigerant discharging portion 523, 533 of the oil guide 52, 53 to the stator coil end 42A, 42B of each unit coil 42a.

Therefore, it is possible to uniformly cool the stator coil ends 42A, 42B in the circumferential direction.

In particular, even in case that it is not possible to position the arc portion 521 of the oil guide 52 close to the non-direct-coupling-side stator coil ends 42A on which bus bars, etc. are disposed, the refrigerant discharging portion 523 is formed into a projection portion that extends towards the stator coil end 42A. With this, the refrigerant can reach the stator coil end 42A of each unit coil 42a. Therefore, it becomes possible to surely cool the stator coil end 42A.

Furthermore, the refrigerant discharging portion 524, 534 is formed at a position of the straight portion 522, 532 of the oil guide 52, 53 that corresponds to the inner peripheral surface of the casing 1 to supply refrigerant toward the inner peripheral surface of the casing 1. With this, it also becomes possible to conduct cooling and lubrication of the bearing 2.

Furthermore, since the oil guide 52 is formed by an insulator, it is possible to extend the refrigerant discharging portion 523 of the oil guide 52 to the vicinity of the stator coil end 42A. With this, it becomes possible to surely supply refrigerant to the stator coil end 42A.

The present invention is not limited to the above-mentioned embodiment, but various modifications are possible to the extent of not deviating from the gist of the present invention.

For example, in the above-mentioned embodiment, there is shown an example in which the refrigerant discharging portion 533 of the oil guide 53 that is disposed to be opposed to the direct-coupling-side stator coil end 42B is an opened hole formed in the arc portion 531. However, the refrigerant discharging portion 533 may be formed to project from the arc portion 531 toward the side of the stator coil end 42B.

Furthermore, in the above-mentioned embodiment, there is shown an example in which each of the oil guides 52, 53 is formed in one piece. However, as long as refrigerant can be ejected from the tip end of the projection portion that extends from the arc portion 521 toward the inner peripheral surface of the casing 1, for example, the arc portion 521, 531 may be separated into those in a semicircular shape by a lower portion.

Furthermore, it is possible to change the length of the refrigerant discharging portion 523 according to need.

Furthermore, in the above-mentioned embodiment, there is shown an example in which the refrigerant introducing portion 51 is installed on the inner side of the casing 1. However, the refrigerant introducing portion 51 may be embedded in the inside of the frame 11 or may be directly formed in the frame 11.

Furthermore, in the above-mentioned embodiment, there is shown an example in which both ends of oil guide 52, 53 are connected to the refrigerant supply ports 512, 513. However, it is optional to form the arc portion 521, 531 into a closed shape (annular shape) and connect a refrigerant-supplying communication portion to this annular shape portion.

Furthermore, in the above-mentioned embodiment, there is shown an example in which one refrigerant discharging portion 523, 533 is provided relative to the stator coil end 42A, 42B of each unit coil 42a. However, a plurality of refrigerant discharging portions may be provided relative to the stator coil end 42A, 42B of each unit coil 42a.

EXPLANATION OF SIGNS

1: casing
2: bearing
3: rotation shaft
4: stator
11: frame
12: non-direct-coupling-side bracket
13: direct-coupling-side bracket
41: stator core
42: stator coil
42a: unit coil
42A, 42B: stator coil end
43: bus bar
51: refrigerant introducing portion
52, 53: oil guide
511: inflow portion
512, 513: refrigerant supply port
514: refrigerant supplying nozzle
521, 531: arc portion
522, 532: straight portion
523, 524, 533, 534: refrigerant discharging portion

The invention claimed is:

1. A cooling structure of a stator of a rotating electrical machine that conducts cooling of stator coil ends by a refrigerant, the cooling structure being equipped with an oil guide, the oil guide comprising:

an arc-shape tube that has a first refrigerant passage therein, the arc-shape tube being opposed to an axial end portion of a stator coil end and being along arrangement of the stator coil end, the arc-shape tube being configured such that the refrigerant is introduced into the first refrigerant passage; and a first tubular portion that projects from a surface of the arc-shape tube toward the stator coil end of each unit coil, the first tubular portion having therein a second refrigerant passage communicating with the first refrigerant passage such that the refrigerant passes from the first refrigerant passage through the second refrigerant passage, and then is discharged from a tip end of the first tubular portion toward the stator coil end of each unit coil.

2. The cooling structure of the stator of the rotating electrical machine as claimed in claim 1, wherein the oil guide comprises an insulator having heat resistance and oil resistance.

3. The cooling structure of the stator of the rotating electrical machine as claimed in claim 1, wherein each unit coil is formed by concentrated winding.

4. The cooling structure of the stator of the rotating electrical machine as claimed in claim 1, wherein the oil guide is disposed to be opposed to the stator coil end on a side that an end portion of a wire constituting a coil is positioned.

5. The cooling structure of the stator of the rotating electrical machine as claimed in claim 1, wherein the oil guide further comprises a second tubular portion above a bearing that supports a rotation shaft of the rotating electrical machine, the second tubular portion being configured to discharge the refrigerant from a tip end of the second tubular portion toward a side that is opposite to the first tubular portion.

* * * * *